Jan. 19, 1943.   S. HILLSTROM   2,308,605
COTTER PIN
Filed June 15, 1940
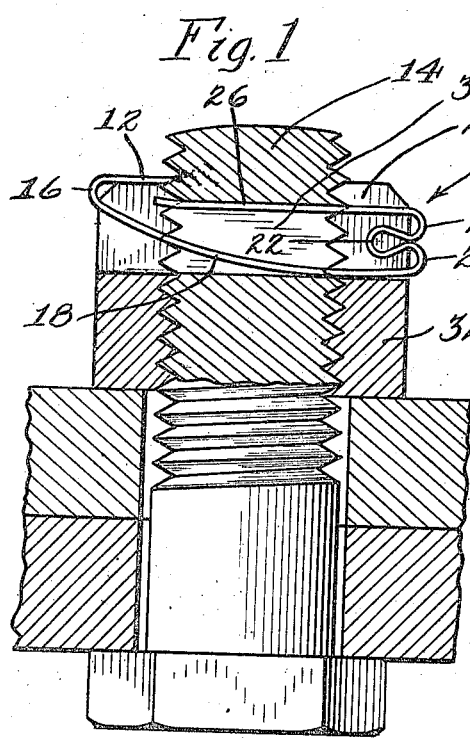
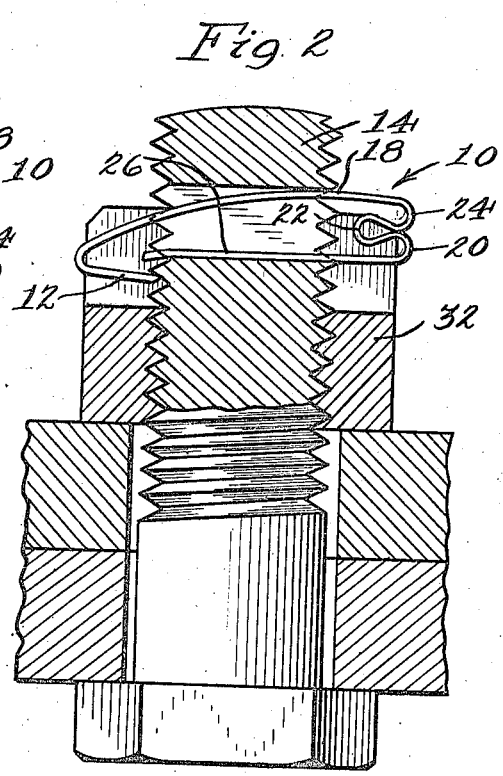
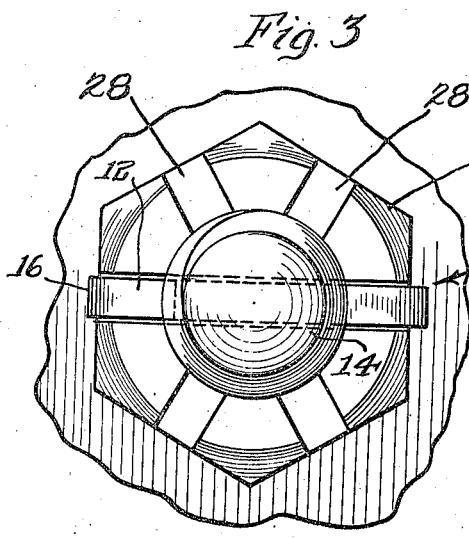
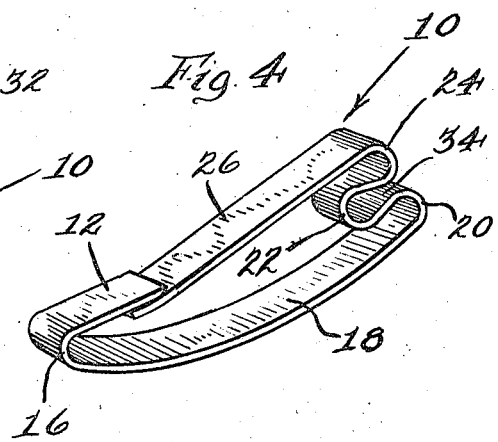
INVENTOR.
BY Sylvia Hillstrom
Cox, Moore & Olson
Attorneys Patented Jan. 19, 1943

2,308,605

UNITED STATES PATENT OFFICE 2,308,605

COTTER PIN

Sylvia Hillstrom, Evanston, Ill.

Application June 15, 1940, Serial No. 340,642

2 Claims. (Cl. 151—6)

This invention relates generally to locking devices for preventing relative rotation between screw threaded elements and more particularly to locking devices of the cotter pin type which are adapted to be inserted within registering apertures of such screw threaded devices. One of the problems incident to the use of cotter pins is that of preventing metal fatigue resulting from vibratory conditions to which cotter pins are normally subjected. Unless the cotter pin is designed so as to withstand such conditions, there is ever present the potential hazard of breakage due to shearing and the like. It is an important object of the present invention to provide a cotter pin which will withstand the most severe conditions of vibration in the field and will stay put once it has been applied to the associated screw threaded parts.

It is a further object of the present invention to provide a cotter pin of the type set forth above which will not only withstand vibratory effects but which possesses an inherent resilient property not present in conventional types of cotter pins with which I am familiar, this resiliency materially contributing toward the efficient functioning of the device.

More specifically, the invention contemplates a cotter pin having a novel bend or reentrant portion at one extremity thereof which contributes a most desirable resilient characteristic in the form of cotter pin contemplated hereby.

The foregoing and numerous other objects and advantages will be more apparent from the following detailed description when considered in connection with the accompanying drawing, wherein:

Fig. 1 is a side elevational view shown partly in section of a combined bolt and nut associated with a work piece and equipped with a cotter pin construction of the type contemplated hereby;

Fig. 2 is a view similar to Fig. 1 disclosing the adaptation of the cotter pin in a position reverse from that shown in Fig. 1;

Fig. 3 is a plan view of the device as illustrated in Fig. 1; and

Fig. 4 is a perspective view of the cotter pin disassociated from the screw threaded elements shown in Figs. 1 to 3, inclusive.

Referring now to the drawing wherein like numerals have been employed to designate similar parts throughout the various figures, it will be seen that one practical embodiment of my invention is represented by the cotter pin designated generally by the numeral 10. This cotter pin 10 includes a section 12 designed particularly for interlocking association with the thread convolutions of a screw or bolt 14. This section 12 is preferably chamfered to facilitate the engagement thereof with the thread convolutions of the bolt 14, as clearly illustrated in Fig. 1. A bent portion 16 is provided at the left extremity of the section 12 and from the bent portion 16 I provide a resilient section 18 which at its right extremity is bent at 20 so as to permit the formation of a reentrant resilient section 22. A bent section 24 serves to connect the reentrant section 22 with a relatively straight section 26 which extends in substantial parallelism with the section 18. The free extremity of the section 26 is adapted to be overlapped by the section 12, as clearly illustrated in Fig. 4.

In applying the cotter pin 10 to the work the extremity which carries the section 12 is first inserted within the registering apertures 28—30 of the nut 32 and the bolt 14, respectively. The width of the cotter pin at its entering extremity is preferably reduced so as to facilitate the initial entrance thereof within said registering apertures 28—30. After the initial insertion of the cotter pin, the upper surface of the section 26 and the lower surface of the section 18 are pressed together due to the engagement therewith of the companion surfaces of the bolt which define the upper and lower limits of the aperture 30. In this connection particular attention is directed to the functioning of the reentrant portion 22. During this insertion of the cotter pin, the flexing of the sections 18 and 26 toward each other is first experienced. This may be said to partake of a hinging action about their respective resilient hinges or bent portions 24—20. Continued insertion of the cotter pin is followed by a collapsing or springing together of the reentrant section 22. Thus, before insertion a space designated by the numeral 34 is present between the two bent sections 20 and 24. However, after complete insertion of the cotter pin within the registering apertures 28—30, the opposed surfaces in the vicinity of these bent portions 20—24 are brought into contact, as clearly illustrated in Figs. 1 and 2.

From the foregoing it will be apparent that the novel structural arrangement of the cotter pin at its greatest width oppositely disposed from its entering end provides the desirable lighter spring action for initial insertion and the more forceful or binding spring action as it approaches the limit of its insertion. This increase in spring tension serves to prevent relative movement of the associated parts resulting from vibrations. The presence of the reentrant portion 22 cooperates in setting up a very strong spring action as the cotter pin is driven to its final locking position and thus sets up a firm frictional grip between the engaging thread convolutions of the nut and bolt.

In Fig. 2 I have disclosed the manner in which the cotter pin 10 may be inserted reversely with respect to the position of insertion shown in Fig. 1. In each instance the section 12 interlocks or engages with a thread convolution of the bolt and the reentrant section 22 cooperates with the spring sections 18 and 26 in securing the cotter pin firmly in position. Obviously, the invention is not limited to the specific structural arrangement of the cotter pin disclosed herein but is capable of other changes in shape, size and design without departing from the spirit and scope of the appended claims.

The invention is hereby claimed as follows:

1. A resilient pin comprising a strip of yieldable stock having an extremity adapted for insertion within an aperture of a work piece, a pair of elongated spring sections adapted to resiliently engage oppositely disposed walls defining said aperture, and a reentrant connecting section extending between said elongated sections and positioned at the extremity oppositely disposed from said entering end, said reentrant connecting section comprising normally spaced arm portions cooperating with said elongated sections in yieldably resisting force tending to collapse said elongated sections during the insertion thereof within an aperture.

2. A cotter pin comprising a strip of yieldable stock and presenting a pair of spaced elongated spring sections adapted to resiliently engage oppositely disposed walls defining an aperture in a screw element, a relatively short section extending laterally of one spring section and having a free extremity for engaging an element such as a thread convolution and a yieldable portion joining said spring sections and comprising a U-shaped connecting section extending inwardly between said elongated sections with the outer extremities of the legs of the U-shaped connecting section secured thereto and operative to yieldably approach to permit the elongated spring sections to yieldably collapse during insertion thereof within an aperture.

SYLVIA HILLSTROM.